United States Patent [19]

Suman

[11] Patent Number: 5,525,977
[45] Date of Patent: Jun. 11, 1996

[54] PROMPTING SYSTEM FOR VEHICLE PERSONALIZATION

[75] Inventor: Michael J. Suman, Holland, Mich.

[73] Assignee: Prince Corporation, Holland, Mich.

[21] Appl. No.: 163,062

[22] Filed: Dec. 6, 1993

[51] Int. Cl.[6] .................... G05B 19/04; G06F 7/04; G06F 15/02; G10K 15/04
[52] U.S. Cl. .................... 340/825.250; 340/825.240; 340/825.300; 340/825.310; 367/197; 395/156
[58] Field of Search .................... 340/825.25, 825.24, 340/825.3, 825.31, 825.32, 825.22, 528, 426, 460; 367/197, 198; 364/286.2, 948.21; 395/156

[56] References Cited

U.S. PATENT DOCUMENTS

| | | | |
|---|---|---|---|
| 2,288,683 | 7/1942 | Clancy | 35/11 |
| 4,373,116 | 2/1983 | Shimizu et al. | 367/198 |
| 4,503,528 | 3/1985 | Nojiri et al. | 367/198 |
| 4,754,255 | 6/1988 | Sanders et al. | 340/825.31 |
| 4,794,368 | 12/1988 | Grossheim | 340/528 |
| 4,839,749 | 6/1989 | Franklin | 360/12 |
| 4,847,763 | 7/1989 | Moser et al. | 364/413.02 |
| 4,856,072 | 8/1989 | Schneider et al. | 367/198 |
| 4,862,363 | 8/1989 | Krisher et al. | 364/424.1 |
| 4,920,338 | 4/1990 | Tsunoda et al. | 340/825.3 |
| 4,967,178 | 10/1990 | Saito et al. | 340/425.5 |
| 5,091,856 | 2/1992 | Hasegawa et al. | 364/424.05 |
| 5,101,357 | 3/1992 | Tempelhof | 364/449 |
| 5,113,182 | 5/1992 | Suman et al. | 340/825.31 |
| 5,113,427 | 5/1992 | Ryoichi et al. | 367/197 |
| 5,146,215 | 9/1992 | Drori | 340/825.32 |
| 5,278,547 | 1/1994 | Suman et al. | 340/825.31 |
| 5,278,759 | 1/1994 | Berra et al. | 364/424.01 |

OTHER PUBLICATIONS

U.S. application Ser. No. 07/904,599 entitled Dead Switch Vehicle Operator Identification, filed Jun. 29, 1992.
U.S. application Ser. No. 07/782,109 entitled Remote Vehicle Programming System, filed Oct. 24, 1991.

*Primary Examiner*—Alyssa H. Bowler
*Assistant Examiner*—Mark H. Rinehart
*Attorney, Agent, or Firm*—Price, Heneveld, Cooper, DeWitt & Litton

[57] ABSTRACT

A personalization system for vehicles uses a CD player and a keyless entry transmitter. The CD player outputs audible prompting signals including accessory operation choices. The driver selects accessory operation by pressing the "LOCK" or "UNLOCK" switch on the keyless entry key fob following an associated audio prompting signal. A controller coupled to the CD player receives a selection signal from the keyless entry key fob and associates the receipt of the selection signal with an index corresponding to the audio prompting signal last output by the CD player. The controller controls accessory operation according to the accessory options selected responsive to the audible prompting signal.

40 Claims, 4 Drawing Sheets

PROMPTING SYSTEM FOR VEHICLE PERSONALIZATION

BACKGROUND OF THE INVENTION

The present invention pertains to vehicle control systems and, more particularly, to a system for programming vehicle accessory operation according to the preferences of each driver of the vehicle.

Vehicle personalization systems are used by drivers to select accessory operation for that vehicle according to their preferences. These systems include an input mechanism for identifying each driver, an input mechanism for selecting vehicle accessory operation to be associated with each of the drivers, a memory for storing the information input using these mechanisms, and a controller for controlling the vehicle options. Examples of accessories which can be programmed for each vehicle driver include the driver's seat position, rearview mirror reflectivity, temperature preferences, outside mirror positions, and other vehicle accessory operation. After programming the vehicle, each time that driver is identified upon entering the vehicle, the seat will automatically move to the selected position, the mirror moves to its selected position, and other accessories will move to their selected conditions.

A particularly advantageous personalization system is disclosed in U.S. Pat. No. 5,113,182 entitled VEHICLE SYSTEMS CONTROL, issued May 12, 1992, the disclosure of which is incorporated herein by reference. This control system allows the vehicle operator to select vehicle accessory operation using a control module removably mounted in the vehicle. Another system for inputting information to a vehicle is disclosed in U.S. patent application Ser. No. 07/904,599, entitled DEAD SWITCH VEHICLE OPERATOR IDENTIFICATION, and filed Jun. 29, 1992, the disclosure of which is incorporated herein by reference. Control information is input to this system using switches in the vehicle which are not operational when the vehicle is not running. For example, power window control switches may be used to identify the driver before the vehicle is started. Both of these systems provide effective vehicle accessory control for the vehicle operator using an input device mounted in the vehicle. However they also require that specific predetermined control steps be performed by the vehicle operators to program the vehicle. This is undesirable to people who are unwilling or unable to follow written instructions or programming electronic devices. Although a dealership can program the vehicle, taking the vehicle to the dealership is inconvenient.

A vehicle personalization system which does not require direct programming is disclosed in U.S. patent application Ser. No. 07/782,109 entitled REMOTE VEHICLE PROGRAMMING SYSTEM, filed Oct. 24, 1991, the disclosure of which is incorporated herein by reference. Personalization is effected in this system by a service provider, such as a car dealership, using a paging system. To program the vehicle, the vehicle owner calls the service provider who effects option control by transmitting control signals to the vehicle from a land based pager transmitter to a receiver mounted in the vehicle. Because the service provider effects vehicle personalization, the driver need not have any technical knowledge as to how to operate the vehicle programming system.

SUMMARY OF THE INVENTION

The present invention provides vehicle personalization which utilizes vehicle electrical system components to implement personalization in a manner which is particularly user friendly.

According to one aspect of the invention, a vehicle audio source generates audible prompting signals. The operator uses an input mechanism to generate response signals after hearing the audible prompting signals. A controller is coupled to the audio source, the input mechanism, and to the vehicle accessories. The controller stores operating instructions according to the response signals input following the generation of the audible prompting signals. The controller controls the vehicle accessories according to the stored program instructions in an operating mode.

The system according to the invention provides a user friendly programming method for establishing vehicle personalization. A plurality of respective associated operating instructions can be stored such that the vehicle is programmed independently for each user. The system includes an audio source which may be utilized for the vehicle audio system in addition to the vehicle prompting system. The prompting system may be implemented without adding significant electronic circuitry to the vehicle.

These and other aspects, features and advantages of the present invention will be better understood upon reading the following more detailed description of the invention and referencing the accompanying drawings in which:

DETAILED DESCRIPTION OF THE PREFERRED EMBODIMENTS

Figure 1:
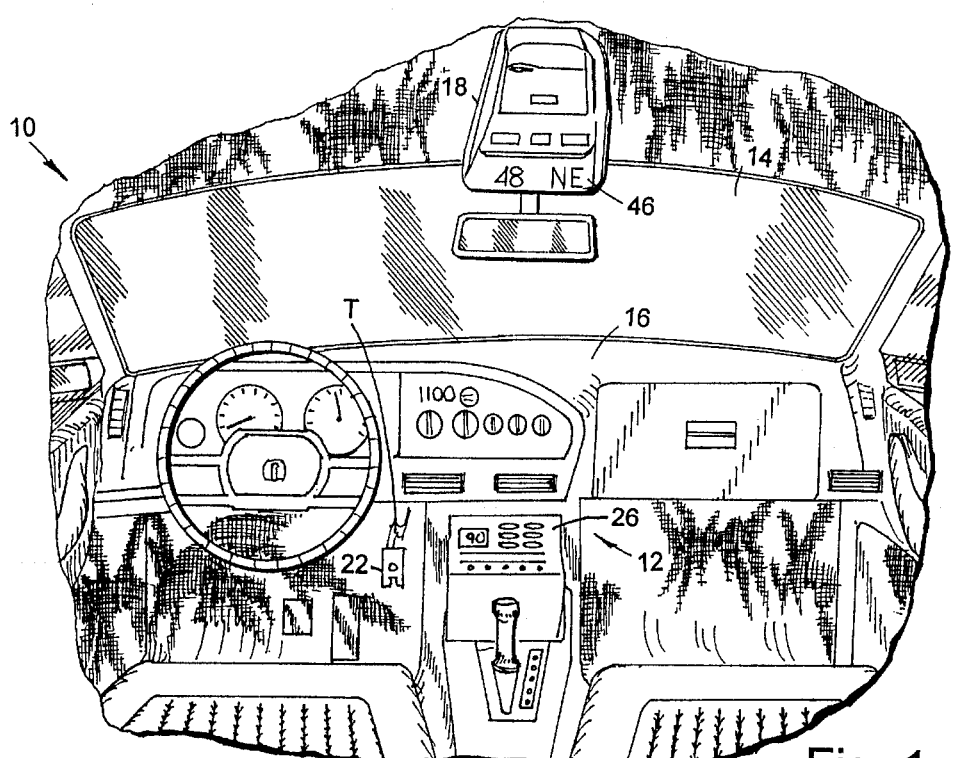
FIG. 1 a perspective pictorial view of a vehicle interior including a personalization system according to the invention.
Figure 2:
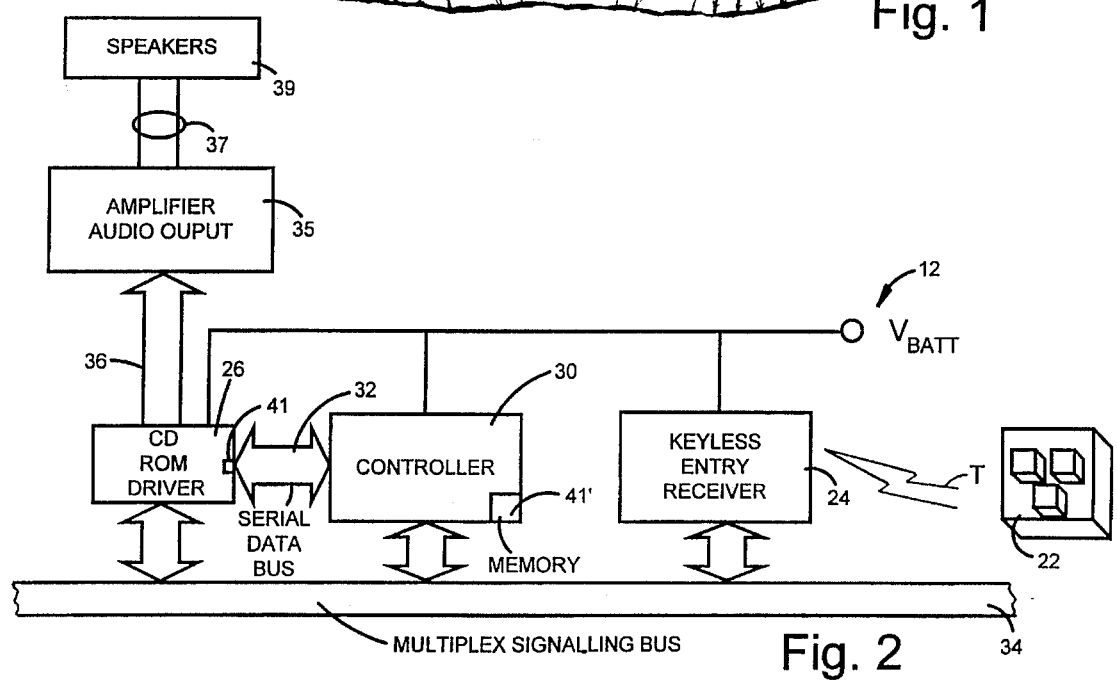
FIG. 2 is a block diagram of an electrical circuit for the personalization system embodying the present invention.
Figure 3:
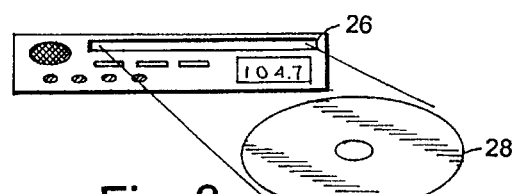
FIG. 3 is a schematic representation of a compact disc player and compact disc utilized in the vehicle personalization system according to FIG. 2.

A vehicle 10 including a personalization system 12 according to the present invention is illustrated in FIG. 1. The illustrated vehicle includes a windshield 14, an instrument panel 16 below the windshield, and a centrally positioned overhead console 18 mounted to the vehicle roof structure. Vehicle 10 also includes a keyless entry system having a key fob 22, which transmits a radio frequency (RF) signal "T" to a conventional remote keyless entry RF receiver 24 (FIG. 2). Receiver 24 is mounted at any suitable location in vehicle 10, such as the overhead console. The personalization system uses a compact disc (CD) driver 26 and a CD 28 (FIG. 3) to generate audio prompting signals. These prompting signals are applied via conductors 36 to an amplifier 35, the output of which is coupled by conductors 37 to vehicle speakers 39, which are suitably mounted in instrument panel 16 (FIG. 1). The vehicle operator uses the keyless entry key fob 22 to input the driver identification (ID) information and to program the vehicle by responding to the audio prompting signals, as described in greater detail hereinbelow.

The personalization system further uses a controller 30 (FIG. 2) which is supported in the overhead console 18 (FIG. 1). The controller 30 (FIG. 2) is coupled to the CD driver 26, through a serial bus 32, and to the keyless entry receiver 24, through the vehicle multiplex bus 34. Controller 30 includes an integral memory 41' wherein accessory operation instructions are stored responsive to prompting signals from the CD driver and control signals from the keyless entry receiver 24. The controller is coupled to the vehicle multiplex signalling bus 34 to communicate option control information which effects desired operation of vehicle accessories.

Amplifier 35 may be integral with the CD driver 26 or it may be any, conventional external audio amplifier. The CD driver 26 also includes a data port 41 connected through serial bus 32 to controller 30. Track and time information are output from the CD driver to data bus 32 through port 41. Control signals including track and time information are input to the CD driver through data bus 32 and port 41 to control the positioning of the CD driver's laser transducer. The CD driver may be implemented using any suitable conventional CD player including a track and time information input/output (I/O). This information is available in CD drivers, and is typically output to a visual display. A preferred embodiment utilizes a Sony MZ1 recordable compact disc player, which has a data port and an audio output. Driver 26 could also be implemented using a tape player, in those vehicles having a tape player instead of a CD player, or a ROM, in those vehicles having an audio system including only a tuner and an amplifier. However, the CD player is preferred because it provides significantly faster access to specific sections of the stored data than is available through a tape player, and a ROM requires circuitry dedicated to the personalization function.

The CD 28 itself has audio prompting signals stored thereon which describe vehicle accessory options which may be selected by the operator. Accessory options which are related are stored in the same tracks to facilitate access and indexing. The user may thus quickly access a particular accessory group by accessing the track including the accessories. In one embodiment of the invention, track 1 includes an introduction, track 2 is used to program lock operation, track 3 is used to program light and mirror operation, track 4 is used to program the audio system, track 5 is used to program vehicle temperature control, track 6 is used to program the drivers seat position, track 7 is used to program a trainable transmitter for garage door opener and home lighting remote control, track 8 is used to program window operation, track 9 is used to program chime operation, and track 10 is used to program option operation responsive to cellular telephone operation. Other tracks may be included for other functions.

The controller 30 is coupled to the CD driver 26 data port 41 through serial bus 32, as mentioned briefly above. The controller is also coupled to the vehicle multiplex bus 34 to receive control signals from the RF receiver 24. The signals received from the keyless entry receiver through multiplex bus 34 include the security code of the receiver, the lock door command, and the unlock door command signals. The controller 30 also receives and transmits control signals on the serial bus 32 for controlling the operation of vehicle options as described in greater detail herein below. The controller 44 may be any suitable commercially available microcontroller, such as the Motorola MC68HCO5P4. The microcontroller is preferably mounted in overhead console 18 and is also utilized for a vehicle compass (not shown) and controlling a console display 46. Display 46 displays vehicle heading and outside temperature information. It is envisioned that the body controller, which is the computer that the vehicle manufacturer provides with the vehicle to control vehicle operation, may alternately be used as the personalization controller. However, the specific controller 30 used for the compass and mounted in the overhead console is preferred because it permits customizing of the vehicle without having to add an additional program to the body controller.

Figure 4:
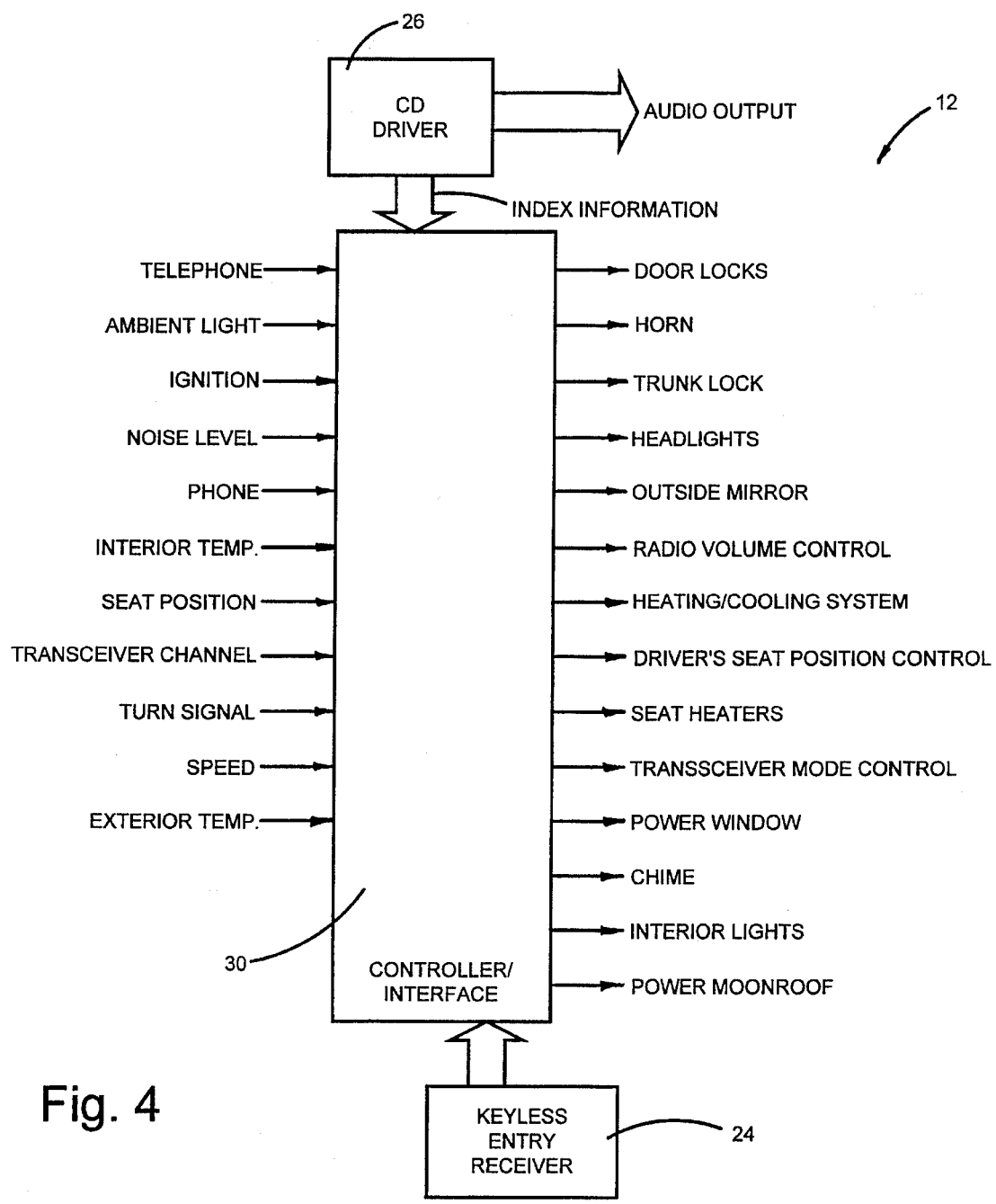
FIG. 4 is an electrical circuit in block and schematic forms showing the control signal inputs and outputs of the controller utilized in the vehicle personalization system according to FIG. 2.

In general, controller 30 controls a variety of different vehicle accessories. As shown in FIG. 4, controller 30 is coupled to the vehicle multiplex bus to control the vehicle door locks, the horn, the trunk lock, headlights, the outside mirror(s), the radio volume control, the vehicle climate control (heating and air conditioning), the driver's seat position, seat heaters, a transceiver, power windows, a chime, interior lights, a power moon roof, and the like. The controller 30 outputs control signals on the vehicle multiplex bus to control these options responsive to control signals from a telephone, an ambient light sensor, the vehicle ignition, a noise level detector, an interior temperature sensor, a seat position sensor, a signals associated with a trainable transceiver, an exterior temperature sensor, the vehicle speedometer, and the like. Those skilled in the art will recognize that these input and output control signals are communicated over the vehicle multiplex bus in commercially available vehicles. Having described the overall environment of the preferred embodiment of the personalization system, the operation of the vehicle prompting system will now be described in detail.

Controller 30 receives index information from the CD driver 26 as the driver outputs audio prompting signals in a training mode. The controller also receives information from keyless entry receiver 24 through the vehicle multiplex bus 34. The controller is responsive to the security code and door lock and unlock control signals from the keyless entry receiver 24 for storing vehicle personalization information in memory 41'. The system stores accessory operation for up to four vehicle operators in the training mode. In an operating mode, each time one of the vehicle driver security codes is input from the RF receiver 24, controller 30 uses the stored operating parameters for that driver to respond to control signals on the multiplex bus 34 and output appropriate option control signals on that bus.

Figure 5:
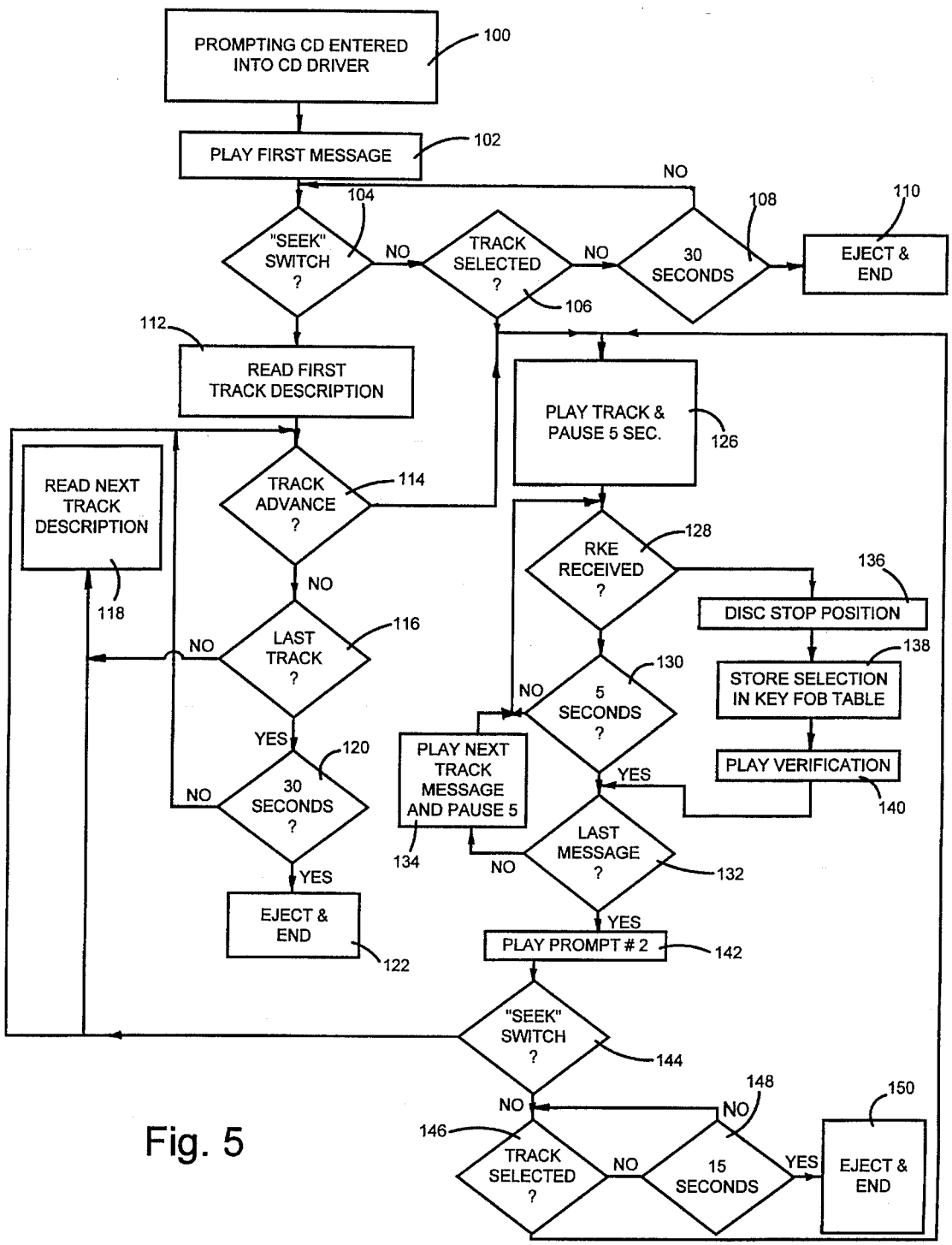
FIG. 5 is a flow diagram of the software employed to control the operation of the controller personalization system according to the present invention.

The programming of vehicle option operability is described with particular reference to FIG. 5. When the operator wants to program the vehicle, which may be when the vehicle is initially programmed, or when the driver wants to change one or more programmed accessory operations; the driver inserts CD 28 into CD driver 26, as indicated in block 100. The CD driver 26 automatically plays the first track message on CD 28 as indicated in block 102. This message includes a prompting announcement explaining how the system works and invites the driver to press the seek switch. The controller then waits for the user to actuate the "SEEK" switch, as indicated in block 104, or the track advance, as indicated in block 106. If the "SEEK" switch or the track advance switch are not selected within 30 seconds of the end of the first message, as indicated in block 108, the controller transmits a signal to CD driver 26 which ejects CD 28 and terminates the training mode, as indicated in block 110.

If the user selects the seek mode, as determined in decision block 104, the controller 30 outputs a control signal to CD driver 26 which controls the CD driver to play the first index topic, as indicated in block 112. The first track topic is a general description of the options programmable using track 2 of CD 28. Controller 30 waits for a track advance control signal indication from CD player 28 responsive to the audio track topic message, as indicated in block 114. If the track advance control signal is not detected, the controller determines whether the topic index has been completed, as indicated in block 116. If it has not been completed, the next index topic message is output to the user, as indicated in block 118. If the topic index is completed, the controller 30 waits a time period, of approximately 20–40 seconds, for the user to select a track, as indicated in blocks 114, 116 and 120. If this time period expires before a track is selected, the controller 30 transmits a control signal to the CD driver 26 which ejects CD 28, and the controller exits the training mode, as indicated in block 122.

If a track was selected, as detected in block 106 or block 114, controller 30 outputs a control signal controlling the CD driver 26 to play the first track message, which invites the user to select accessory operation by pressing the lock or unlock switch on key fob 22, as indicated in block 126. If the user does not press the lock or unlock switch on key fob 22, as detected at block 128, within 5 seconds of completion of the audible prompting signal, as shown in block 130, and the request message was not the last message on the track, as determined in block 132, controller 30 controls CD driver 26 to output the next option operation request message as indicated in block 134. If a remote keyless entry lock or unlock signal is received before the five second pause is ended, as indicated in block 128, the controller identifies the stop position, as indicated in block 136. The controller stores the operation selected by the user in controller memory 41' in a respective table identified by the key fob used by that driver. After storing the accessory operation, the controller applies a verification control signal to input port 41 of CD driver 26 to control the CD to output a prerecorded verification signal whose address is programmed in controller memory 41' telling the user what is selected (e.g., "you selected (option operation))." The controller then precedes to block 132.

If it is determined in block 132 that the last accessory operation selection message in the track being read was output, the controller 30 outputs a control signal to the CD player which controls the CD player to play a prompt message from CD 28 which informs the user that the system will continue in the "SEEK" mode if the "SEEK" switch is actuated, or the user should select another track, as indicated in block 142. Controller 30 then waits for the "SEEK" switch or the track advance switch to be actuated, as indicated in blocks 144 and 146. The controller waits a predetermined time period, such as 15 seconds, for the "SEEK" switch or the track advance to be actuated. If the "SEEK" switch is actuated, the controller precedes to block 118, and reads the description of the next track. If track 10 was the last track selected, the description of track 2 will be played at this time. If a specific track is selected, as determined in block 146, that track's message is played, as indicated in block 126. If no action is taken within the 15 second time period following playing of the prompting message in block 142, the controller precedes to block 50, and training is terminated. The controller automatically returns to the operating mode when the training mode is terminated, wherein the input control signals on the multiplex bus are detected and the programmed output accessory control signals are supplied to the multiplex bus.

Described below are the CD track number and the lock/unlock key fob signals used to select the controller operation for each programmable accessory. The tracks include repeated option functions. As can also be seen, the lock and unlock key fob signals are used to select all the option operations. Other control input signals sources could likewise be employed. A sample disc recording is as follows:

Welcome to your new compact disc personalization system.

Your vehicle has been designed to train over 40 items that can function differently for up to four drivers.

Use your remote keyless entry transmitter located on your key fob to automatically let your vehicle know: when you are approaching and who you are.

We have divided these items into ten categories. Each category can be accessed by listening to its track on this CD.

When you are ready to inform your vehicle who you are and the functions you would like it to perform, press "SEEK" to continue.

If you would like to customize something in the door locking category, press "TRACK ADVANCE" until you get to track 2.

If you would like to customize something in the exterior lighting or mirror category press, TRACK ADVANCE until you get to track 3.

If you would like to customize something in the radio CD, entertainment system category, press "TRACK ADVANCE" until you get to track 4.

If you would like to customize something in the automatic temperature category, press "TRACK ADVANCE" until you get to track 5.

If you would like to customize something in the seating category, press "TRACK ADVANCE" until you get to track 6.

If you would like to customize something in the automatic garage door opener category, press "TRACK ADVANCE" until you get to track 7.

If you would like to customize something in the window category, press "TRACK ADVANCE" until you get to track 8.

If you would like to customize something in the chime category, press "TRACK ADVANCE" until you get to track 9.

If you would like to customize something in the phone category, press "TRACK ADVANCE" until you get to track 10.

This is track 2 which will allow you to personalize items in the Remote Keyless system:

1. If you would like all of your doors to unlock with your remote keyless system, press "LOCK" to activate or "UNLOCK" to deactivate during this pause.

2. If you would like only your driver's door to unlock with your remote keyless system, press "LOCK" to activate or "UNLOCK" to deactivate during this pause.

3. If you would like your doors to automatically lock when you put your car in drive, press "lock" to activate or "unlock" to deactivate during this pause.

4. If you would like your doors to automatically unlock when you put your car in park, press "lock" to activate or "lock" to deactivate during this pause.

5. If you would like all of your doors to automatically unlock when you unlock your car with your door key, press "lock" to activate or "unlock" to deactivate during this pause (if "YES" is selected for this option, skip item 6).

6. If you would like only your driver's door to unlock when you unlock your car with your door key, press "lock" to activate or "unlock" to deactivate during this pause.

7. Your vehicle has been designed to offer you two different items to activate when you unlock your doors from outside using your key. A second unlock rotation will do either of the following functions if you have selected driver's door only for the first key rotation. These functions are:
   open the trunk
   open the fuel door 8. If you would like your trunk to open when you rotate your door key the second time, press "lock" to activate or "unlock" to deactivate during this pause (if "YES," skip item 9).

9. If you would like your fuel door to open when you rotate your door key the second time, press "lock" to activate or "unlock" to deactivate during this pause.

10. If you would like your horn to chirp to acknowledge your doors are locking when you use RKE, press "lock" to activate or "unlock" to deactivate during this short pause.

11. If you would like your lights to flash and horn to honk in a panic alert mode when you press any two buttons on your RKE, press "lock" to activate or "unlock" to deactivate during this pause.

12. The third button on your keyless transmitter can be changed to do two different functions, they are unlock your trunk or unlatch your fuel door.

13. If you would like the third button on your key fob to unlock your trunk, press "lock" to activate or "unlock" to deactivate during this pause (if "YES," skip item 14).

14. If you would like the third button on your key fob to unlock your fuel door, press "lock" to activate or "unlock" to deactivate during this pause.

15. A feature we call "Last Door Closed Locks the Doors" is an option that allows the doors to lock only when all of the doors have been closed for ten seconds. This allows the driver with the driver's door open to press the door lock button and hear a confirmation chime. However, at this time, the doors will not lock until all the doors have been closed for ten seconds. This allows the driver to give the car a lock command and leave the vehicle while other passengers are getting out and the car will lock itself and chirp the horn to let the driver know if the doors are locked.

16. If you would like the last door closed locks the door, press "lock" to activate or "unlock" to deactivate during this pause.

This is track 3 which will allow you to personalize items in the lighting and mirror systems:

1. If you would like your headlights to automatically come on at dusk, press "lock" to activate or "unlock" to deactivate during this pause.

2. If you would like your headlights to remain on for a predetermined period of time after the ignition is turned off, press "lock" to activate or "unlock" to deactivate during this pause.

2a. you have selected the option to have your headlights remain on when your vehicle is turned off. To select the amount of time delay you prefer, press "lock" when the time delay you would like is announced, 15 seconds-[pause]-25 seconds-[pause]-35 seconds-[pause]-45 seconds-[pause] (proceed on to item 3 as soon as RKE is acknowledged).

3. If you would like your interior lights to turn on after the ignition is turned off until a door is opened or a 30 second time delay turns them off, press "lock" to activate or "unlock" to deactivate during this pause.

4. If you would like your right-hand mirror to automatically tilt down to improve curb vision when backing up, press "lock" to activate or "unlock" to deactivate during this pause.

This is track 4 which will allow you to personalize items in the radio and CD systems:

1. If you would like your radio/CD player to return to your last used station, presets, and volume, press "lock" to activate or "unlock" to deactivate during this pause.

2. If you would like the volume on your radio to automatically adjust to the interior noise level, press "lock" to activate or "unlock" to deactivate during this pause.

This is track 5 which will allow you to personalize items in the temperature system:

1. If you would like your inside temperature controls to return to your last used setting, press "lock" to activate or "unlock" to deactivate during this pause.

This is track 6 which will allow you to personalize items in the seating system:

1. If you would like your seats to return to your last used position, press "lock" to activate or "unlock" to deactivate during this pause.

2. If you would like your seat heating feature to automatically activate with cold temperature, press "lock" to activate or "unlock" to deactivate during this pause.

3. When you are getting out of your vehicle, if you would like your seats to automatically go to full retract and low position for ease of exit/entry, press "lock" to activate or "unlock" to deactivate during this pause.

This is track 7 which will allow you to personalize items in the garage door opener and home lighting systems:

1. You have three buttons built into your overhead console that can communicate with your home's garage door openers and with the addition of an interface module, you can also turn on lights in your home without changing any house wiring.

If you would like to train one or more garage doors without home lighting, press "lock" to activate or "unlock" to deactivate during this pause (if "YES," go to 2 now). If you would like to train one or more garage doors and the home lighting options, press "lock" to activate or "unlock" to deactivate during this pause (if "YES," go to 3 now).

2. You have selected the option of training the garage door without the home lighting feature. The home lighting feature can always be added later by contacting the source mentioned in your handbook.

A. Select one of the three buttons in your overhead that you would like to use for the door you are about to train. Press and hold this button until the indicator light pulses slowly, this will take about 30 seconds.

B. We can now confirm that you are holding your button in, keep holding that button in while you place your current transmitter with a couple of inches of the button you are holding. We will let you know when this process is complete . . . (5 second pause)

. . . We have received, trained and stored the signal from your garage door opener. Training is now complete.

C. Repeat this process for each additional door you would like to train.

3. You have selected the option of training the garage door without the home lighting feature. The home lighting feature can always be added later by contacting the company mentioned in your handbook.

A. Select one of the three buttons in your overhead that you would like to use for the door you are about to train. Press and hold this button until the indicator light pulses slowly, this will take about 30 seconds.

B. While continuing to hold the bottom, place your current transmitter with a couple of inches of the bottom you are holding and press the button on your current transmitter until the same indicator light pulses rapidly. Then release all buttons, at this point your trainable garage door system is trained.

C. Repeat this process for each additional door you would like to train.

You are now ready for the home lighting portion of your home control options. You can train one button to be lights on with one push and the same button to be lights off with another push, leaving the other two buttons for garage door opener controls.

Or you can train one button for lights on and one button for lights off. To do either of these home lighting functions, you must plug the Prince home lighting module into your garage or anywhere inside the house that is a close as possible to where you part your car.

When you plug this module into a wall outlet you will note there are four selections for the train mode. They are: garage open/close; lights on; lights off; lights on/lights off. Select the first one you would like to train to the button or buttons in your car. When you have made this selection, press and hold the button on the module in your garage for about 20 seconds or until the train light flashes. At that point go to your car and press the button you would like trained to the function you have selected, when the garage module and car have learned each others language the garage module will buzz to acknowledge training.

This is track 8 which will allow you to personalize window functions:

1. If you would like some of your windows to have the express down feature, press "lock" to activate and "" to deactivate when you hear each window mentioned: driver's door-5 sec pause; passenger's door-5 sec pause; right rear door-5 sec pause; left rear door-5 sec pause.

2. If you would like your window (and moonroof if equipped) to automatically open when you use your RKE and the inside temperature is over 100 degrees F., press "lock" to activate or "unlock" to deactivate during this pause.

3. If you would like your windows and sunroof to automatically close when raining, press "lock" to activate or "unlock" to deactivate during this pause.

This is track 9 which will allow you to personalize chime functions:

1. If you would like your turn signal chime to get louder the longer it is on, press "lock" to activate or "unlock" to deactivate during this pause.

2. If you would like your chime to alert you when your fuel remaining is 2 gallons, press "lock" to activate or "unlock" to deactivate during this pause.

3. If you would like your chime and message center to alert you when outside temperature is indicating ice could be forming on the road surface, press "lock" to activate or "unlock" to deactivate during this pause.

4. If you would like your chime to alert you when your turn signal has been on for more than 20 blinks, press "lock" to activate or "" to deactivate during this pause.

5. If you would like your chime to alert you when it has picked up a pattern in your driving that could indicate you might be getting drowsy, press "lock" to activate or "unlock" to deactivate during this pause.

6. If you are driving without cruise control on you can press "ACCEL" any time and the chime will alert you if you increase your speed by more than 5 mph if you would like this option, press "lock" to activate or "unlock" to deactivate during this pause.

This is track 10 which will allow you to personalize phone or messaging functions:

1. If you would like sunroof to automatically close when you get a phone call, press "lock" to activate or "unlock" to deactivate during this pause.

2. If you would like your radio speakers to automatically mute when you get a phone call, press "lock" to activate or "unlock" to deactivate during this pause.

3. If you would like to enable your vehicle to receiver pager messages, fill out the card in your owner's manual or call the 1/800 number indicated.

Figure 6:
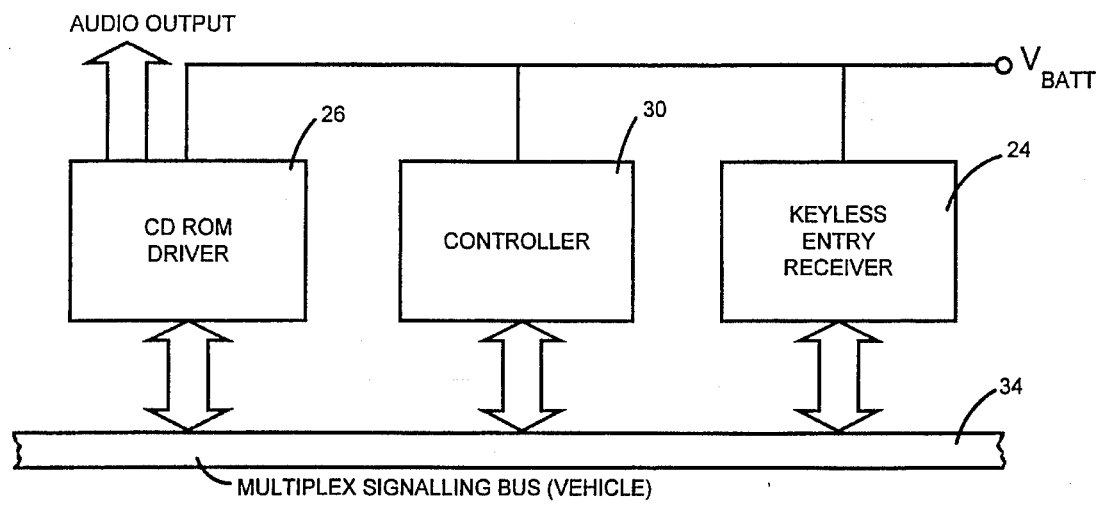
FIG. 6 is an electrical circuit in block diagram form of an alternate embodiment of the vehicle personalization system.
Figure 7:
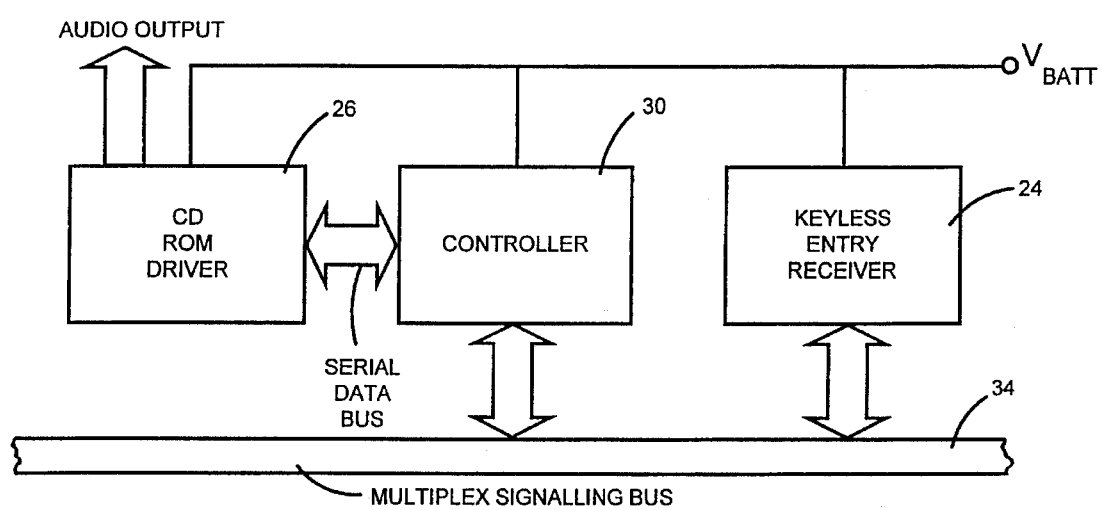
FIG. 7 is an electrical circuit in block diagram form of another alternate embodiment of the personalization system.

According to an alternate embodiment of the invention, the CD driver is connected only to the multiplex bus 34 as illustrated in FIG. 6. In this embodiment, all control signals between the CD driver and the controller 30 are communicated over the multiplex bus 34. According to still another embodiment of the invention, the CD driver and the controller are only connected through the serial bus 32, as illustrated in FIG. 7. This eliminates connection of the CD player 26 to the multiplex bus 34 such that the CD player does not have to interface with the vehicle signalling bus. These alternate embodiments reduce the connections which are required for the CD driver, which facilitates the use of CD drivers having a single data port.

Thus it can be seen that a vehicle prompting system is disclosed which is user friendly and utilizes multi-task accessories to program the vehicle. Each of the accessories is programmed by responses to an audible prompting message. The responses are lock or unlock signals from a keyless entry key fob. In this manner, the vehicle operator may readily personalize the vehicle according to personal preferences using existing vehicle accessories.

Various modifications to the preferred embodiment of the invention described herein can be made by those skilled in the art. For example, input mechanisms other than the keyless entry switch may be used to select the desired operation, such as vehicle window control switches, a "SCAN" switch on a radio, or the like. Such modifications will fall within the spirit and scope of the invention as defined by the appended claims.

The embodiments of the invention in which an exclusive property or privilege is claimed are defined as follows:

1. A system for programming the selectable operation of programmable vehicle options prior to using such options, said system comprising:

a compact disc including index information and audio instructional information stored thereon for the operator prompting of programming instructions;

a compact disc player for receiving said compact disc and responsive to said index and audio instructional information stored on said compact disc for simultaneously generating index signals and audio prompting signals;

a selection input device outputting selection signals;

a controller coupled to said compact disc player and to said selection device for receiving said index signals and said selection signals, said controller operating in a training mode and an operating mode, said controller responsive to said index signals and said selection signals for selecting and storing vehicle accessory operation instructions in the training mode, and said controller coupled to the vehicle electrical system for controlling the operation of vehicle accessories according to said stored vehicle accessory operation instructions in the operating mode.

2. The system as defined in claim 1, wherein said index information includes track and time information for said compact disc.

3. The system as defined in claim 2, wherein each track of said compact disc includes control information for selecting vehicle accessory operation in the vehicle, whereby a user can access a track having the type of option the user would like to program to expedite selection of the vehicle accessory operation.

4. The system as defined in claim 1 and further including a transducer, wherein said audio compact disc player audibly outputs the audio prompting signals through said transducer and said controller waits for a selection signal from said selection input device following output of the audio prompting signals.

5. The system as defined in claim 3, wherein said compact disc includes a track that includes audio instructional information for programming said controller to control vehicle locks.

6. The system as defined in claim 3, wherein said compact disc includes a track that includes audio instructional information for programming said controller to control lamps.

7. The system as defined in claim 3, wherein said compact disc includes a track that includes audio instructional information for programming said controller to control a vehicle audio system.

8. The system as defined in claim 3, wherein said compact disc includes a track that includes audio instructional information for programming said controller to control vehicle interior temperatures.

9. The system as defined in claim 3, wherein said compact disc includes a track that includes audio instructional information for programming said controller to control vehicle seating.

10. The system as defined in claim 3, wherein said compact disc includes a track that includes audio instructional information for programming said controller to control vehicle seat options.

11. The system as defined in claim 3, wherein said compact disc includes a track that includes audio instructional information for programming said controller to control a trainable transmitter.

12. The system as defined in claim 3, wherein said compact disc includes a track that includes audio instructional information for programming said controller to control vehicle windows.

13. The system as defined in claim 3, wherein said compact disc includes a track that includes audio instructional information for programming said controller to control vehicle alarms.

14. The system as defined in claim 3, wherein said compact disc includes a track that includes audio instructional information for programming said controller to control a telephone.

15. A vehicle personalization system for programming the manner in which a plurality of vehicle accessories will operate upon actuation, comprising:

an audio source for generating a plurality of audible prompting signals and for generating index signals corresponding to the audible prompting signals, each audible prompting signal being associated with one of the plurality of vehicle accessories;

input means for generating response signals responsive to said audible prompting signals; and a controller coupled to said audio source for receiving said index signals, to said input means, and to the vehicle accessories, said controller responsive to the response signals received from said input means and to the index signals for storing vehicle accessory operation instructions when in a training mode, and said controller controlling the vehicle accessories according to said stored vehicle accessory operation instructions when in an operating mode.

16. The system as defined in claim 15, wherein said controller stores respective driver identification signals each associated with one of a plurality of vehicle drivers.

17. The system as defined in claim 16, wherein each of said driver identification signals has associated therewith respective vehicle accessory operation instructions uniquely selected in a respective training operation.

18. The system as defined in claim 17, wherein said audio source includes an audio storage device.

19. The system as defined in claim 18, wherein said audio storage device is a compact disc and said audio source further includes a compact disc player.

20. The system as defined in claim 19, wherein said input means includes a keyless entry receiver.

21. The system as defined in claim 20, wherein each of said driver identification signals is a security code associated with a keyless entry key fob.

22. A vehicle personalization system for programming the manner in which a plurality of vehicle accessories will operate upon actuation, comprising:

an audio source for generating a plurality of audible prompting signals, each audible prompting signal being associated with one of the plurality of vehicle accessories, wherein said audio source includes a compact disc and a compact disc player;

input means for generating response signals responsive to said audible prompting signals, wherein said input means includes a keyless entry receiver; and a controller coupled to said audio source, to said input means, and to the vehicle accessories, said controller responsive to the response signals received from said input means following an audible prompting signal for storing vehicle accessory operation instructions when in a training mode, and said controller controlling the vehicle accessories according to said stored vehicle accessory operation instructions when in an operating mode, wherein said controller stores respective driver identification signals each associated with one of a plurality of vehicle drivers, each of said driver identification signals has associated therewith respective vehicle accessory operation instructions uniquely selected in a respective training operation and each of said driver identification signals is a security code associated with a keyless entry key fob, and wherein said audio source outputs index and prompting signal information used for selecting a vehicle accessory operation and wherein said controller, when in the training mode, scrolls through said index information, generates audible index signals describing which vehicle accessory operation may be selected in each index, and advances to an index corresponding to a selected vehicle accessory operation.

23. A system for selecting vehicle option operation, comprising:
   a storage device for storing index and prompting signal information used for selecting vehicle accessory operation;
   a prompting circuit coupled to said storage device for generating index information and audible training requests identifying accessory selections programmable in the vehicle;
   input means for inputting response signals; and
   a controller coupled to said prompting circuit and to said input means, said controller storing accessory operation instructions when in a training mode and controlling vehicle accessory operation according to stored vehicle accessory operation instructions when in an operating mode, said controller, when in the training mode, generates audible signals describing which vehicle accessory operation may be modified in response to the index information provided from said prompting circuit.

24. The system as defined in claim 23, wherein said controller stores driver identification signals each associated with one of a plurality of vehicle drivers.

25. The system as defined in claim 24, wherein each of said driver identification signals has associated therewith respective vehicle accessory operation instructions uniquely selected in a respective training operation.

26. A system for selecting vehicle option operation, comprising:
   a storage device for storing index and prompting signal information used for selecting vehicle accessory operation;
   a prompting circuit coupled to said storage device for generating audible index information and audible training requests identifying accessory selections programmable in the vehicle, wherein said storage device is a compact disc and said prompting circuit includes a compact disc drive;
   input means for inputting response signals; and
   a controller coupled to said prompting circuit and to said input means, said controller storing accessory operation instructions when in a training mode and controlling vehicle accessory operation according to stored vehicle accessory operation instructions when in an operating mode, said controller, when in the training mode, scrolls through the index information, generates audible signals describing which vehicle accessory operation may be selected in each index, and advances to an index corresponding to a selected vehicle accessory operation.

27. The system as defined in claim 26, wherein said input means includes a keyless entry receiver.

28. The system as defined in claim 27, wherein said keyless entry receiver is a keyless entry key fob having a security code associated therewith corresponding to the driver identification signal.

29. The system as defined in claim 1, wherein said controller enters the training mode when said compact disc is coupled to said compact disc player and said compact disc player is activated to read information on said compact disc.

30. The system as defined in claim 1, wherein said compact disc player includes an index input selector for selecting a desired index.

31. The system as defined in claim 30, wherein said compact disc player generates an index signal when an index is selected using said index input selector, and provides the index signal corresponding to the selected index to said controller.

32. The system as defined in claim 15, wherein said audio source includes index information for each of said plurality of audible prompting signals and an index input selector for selecting a desired index, and wherein said audio source outputs index signals corresponding to a selected index to said controller.

33. The system as defined in claim 19, wherein said controller enters the training mode when said compact disc is loaded into said compact disc player.

34. The system as defined in claim 23, wherein said storage device is removably coupled to said prompting circuit.

35. The system as defined in claim 34, wherein said controller enters the training mode when said storage device is coupled to said prompting circuit.

36. The system as defined in claim 23, wherein said prompting circuit includes an index input selector for selecting a desired index.

37. The system as defined in claim 36, wherein said prompting circuit generates an index signal when an index is selected using said index input selector, and provides the index signal corresponding to the selected index to said controller.

38. The system as defined in claim 23, wherein said prompting circuit is a compact disc driver of a vehicle audio entertainment system and said storage device is a compact disc.

39. A system for programming the selectable operation of vehicle accessories prior to using such accessories in a vehicle having an audio system including a compact disc player having a data port and a track selection actuator, the system comprising:
   a compact disc having index information and audio instructional information stored thereon for operator prompting of programming instructions;
   an input selector for outputting selection signals; and
   a controller coupled to the data port of the vehicle compact disc player, for receiving the selection signals from said input selector and index signals from the compact disc player, which the compact disc player generates from the index information stored on said compact disc, said controller operating in a training mode and in an operating mode, said controller responsive to said index signals and said selection signals for selecting and storing vehicle accessory operation instructions in the training mode, and said controller controlling the operation of vehicle accessories according to said stored vehicle accessory operation instructions in the operating mode.

40. The system as defined in claim 39, wherein said controller operates in the training mode when said compact disc is loaded into the compact disc player and said compact disc player is activated to read information on said compact disc.

* * * * *

UNITED STATES PATENT AND TRADEMARK OFFICE
CERTIFICATE OF CORRECTION

PATENT NO. : 5,525,977
DATED : June 11, 1996
INVENTOR : Michael J. Suman

It is certified that error appears in the above-identified patent and that said Letters Patent is hereby corrected as shown below:

Column 1, line 46;
"or programming" should be --for programming--.

Column 2, line 29;
After "Fig. 1" insert --is--.

Column 3, line 19;
After "any" insert --suitable--.

Column 4, line 27;
Delete "a" second occurrence.

Column 6, line 27;
" TRACK ADVANCE " should be --"TRACK ADVANCE"--.

Column 6, line 61;
"lock" should be --LOCK--.

Column 6, line 62;
"unlock" should be --UNLOCK--.

Column 6, line 64;
"lock" should be --LOCK--.

Column 6, line 65;
"lock" should be --UNLOCK--.

Column 7, line 1;
"lock" should be --LOCK--.

UNITED STATES PATENT AND TRADEMARK OFFICE
CERTIFICATE OF CORRECTION

PATENT NO. : 5,525,977
DATED : June 11, 1996
INVENTOR : Michael J. Suman

It is certified that error appears in the above-identified patent and that said Letters Patent is hereby corrected as shown below:

Column 7, line 1;
"unlock" should be --UNLOCK--.

Column 7, line 6;
"lock" should be --LOCK--.

Column 7, line 6;
"unlock" should be --UNLOCK--.

Column 7, line 17;
"lock" should be --LOCK--.

Column 7, line 18;
"unlock" should be --UNLOCK--.

Column 7, line 21;
"lock" should be --LOCK--.

Column 7, line 22;
"unlock" should be --UNLOCK--.

Column 7, line 24;
"lock" should be --LOCK--.

Column 7, line 25;
"unlock" should be --UNLOCK--.

Column 7, line 29;
"lock" should be --LOCK--.

UNITED STATES PATENT AND TRADEMARK OFFICE
CERTIFICATE OF CORRECTION

PATENT NO. : 5,525,977
DATED : June 11, 1996
INVENTOR : Michael J. Suman

It is certified that error appears in the above-identified patent and that said Letters Patent is hereby corrected as shown below:

Column 7, line 29;
　"unlock" should be --UNLOCK--.

Column 7, line 36;
　"lock" should be --LOCK--.

Column 7, line 36;
　"unlock" should be --UNLOCK--.

Column 7, line 39;
　"lock" should be --LOCK--.

Column 7, line 40;
　"unlock" should be --UNLOCK--.

Column 7, line 53;
　"lock" should be --LOCK--.

Column 7, line 53;
　"unlock" should be --UNLOCK--.

Column 7, line 58;
　"lock" should be --LOCK--.

Column 7, line 58;
　"unlock" should be --UNLOCK--.

Column 7, line 62;
　"lock" should be --LOCK--.

UNITED STATES PATENT AND TRADEMARK OFFICE
CERTIFICATE OF CORRECTION

PATENT NO. : 5,525,977
DATED : June 11, 1996
INVENTOR : Michael J. Suman

It is certified that error appears in the above-identified patent and that said Letters Patent is hereby corrected as shown below:

Column 7, line 62;
    "unlock" should be --UNLOCK--.

Column 7, line 66;
    "lock" should be --LOCK--.

Column 8, line 7;
    "lock" should be --LOCK--.

Column 8, line 8;
    "unlock" should be --UNLOCK--.

Column 8, line 11;
    "lock" should be --LOCK--.

Column 8, line 11;
    "unlock" should be --UNLOCK--.

Column 8, line 16;
    "lock" should be --LOCK--.

Column 8, line 17;
    "unlock" should be --UNLOCK--.

Column 8, line 19;
    "lock" should be --LOCK--.

Column 8, line 20;
    "unlock" should be --UNLOCK--.

UNITED STATES PATENT AND TRADEMARK OFFICE
CERTIFICATE OF CORRECTION

PATENT NO. : 5,525,977
DATED : June 11, 1996
INVENTOR : Michael J. Suman

It is certified that error appears in the above-identified patent and that said Letters Patent is hereby corrected as shown below:

Column 8, line 24;
　　"lock" should be --LOCK--.

Column 8, line 25;
　　"unlock" should be --UNLOCK--.

Column 8, line 29;
　　"lock" should be --LOCK--.

Column 8, line 29;
　　"unlock" should be --UNLOCK--.

Column 8, line 32;
　　"lock" should be --LOCK--.

Column 8, line 33;
　　"unlock" should be --UNLOCK--.

Column 8, line 36;
　　"lock" should be --LOCK--.

Column 8, line 37;
　　"unlock" should be --UNLOCK--.

Column 8, line 48;
　　"lock" should be --LOCK--.

Column 8, line 48;
　　"unlock" should be --UNLOCK--.

UNITED STATES PATENT AND TRADEMARK OFFICE
CERTIFICATE OF CORRECTION

PATENT NO. : 5,525,977
DATED : June 11, 1996
INVENTOR : Michael J. Suman

It is certified that error appears in the above-identified patent and that said Letters Patent is hereby corrected as shown below:

Column 8, line 51;
"lock" should be --LOCK--.

Column 8, line 51;
"unlock" should be --UNLOCK--.

Column 8, line 63;
"with" should be --within--.

Column 9, line 11;
"bottom" should be --button--.

Column 9, line 12;
"with" should be --within--.

Column 9, line 13;
"bottom" should be --button--.

Column 9, line 26;
"a" should be --as--.

Column 9, line 27;
"part" should be --park--.

Column 9, line 42;
"lock" should be --LOCK--.

Column 9, line 42;
" "" " should be --"UNLOCK"--

UNITED STATES PATENT AND TRADEMARK OFFICE
CERTIFICATE OF CORRECTION

PATENT NO. : 5,525,977
DATED : June 11, 1996
INVENTOR : Michael J. Suman

It is certified that error appears in the above-identified patent and that said Letters Patent is hereby corrected as shown below:

Column 9, line 50;
    "lock" should be --LOCK--.

Column 9, line 50;
    "unlock" should be --UNLOCK--.

Column 9, line 53;
    "lock" should be --LOCK--.

Column 9, line 54;
    "unlock" should be --UNLOCK--.

Column 9, line 58;
    "lock" should be --LOCK--.

Column 9, line 58;
    "unlock" should be --UNLOCK--.

Column 9, line 61;
    "lock" should be --LOCK--.

Column 9, line 62;
    "unlock" should be --UNLOCK--.

Column 9, line 66;
    "lock" should be --LOCK--.

Column 9, line 67;
    "unlock" should be --UNLOCK--.

UNITED STATES PATENT AND TRADEMARK OFFICE
CERTIFICATE OF CORRECTION

PATENT NO. : 5,525,977
DATED : June 11, 1996
INVENTOR : Michael J. Suman

Page 8 of 9

It is certified that error appears in the above-identified patent and that said Letters Patent is hereby corrected as shown below:

Column 10, line 3;
    "lock" should be --LOCK--.

Column 10, line 3;
    " "" " should be --"UNLOCK"--.

Column 10, line 6;
    "lock" should be --LOCK--.

Column 10, line 7;
    "unlock" should be --UNLOCK--.

Column 10, line 11;
    "lock" should be --LOCK--.

Column 10, line 12;
    "unlock" should be --UNLOCK--.

Column 10, line 16;
    "lock" should be --LOCK--.

UNITED STATES PATENT AND TRADEMARK OFFICE
CERTIFICATE OF CORRECTION

PATENT NO. : 5,525,977
DATED : June 11, 1996
INVENTOR : Michael J. Suman

It is certified that error appears in the above-identified patent and that said Letters Patent is hereby corrected as shown below:

Column 10, line 17;
    "unlock" should be --UNLOCK--.

Column 10, line 19;
    "lock" should be --LOCK--.

Column 10, line 20;
    "unlock" should be --UNLOCK--.

Column 10, line 21;
    "receiver" should be --receive--.

Signed and Sealed this

Seventeenth Day of September, 1996

BRUCE LEHMAN

*Attest:*

*Attesting Officer*          *Commissioner of Patents and Trademarks*